United States Patent [19]

Fleet

[11] 4,032,386

[45] June 28, 1977

[54] DEVICE FOR APPLYING LABELS TO ARTICLES

[75] Inventor: Ronald P. J. Fleet, Landing, N.J.

[73] Assignee: Monarch Marking Systems, Inc., Dayton, Ohio

[22] Filed: July 26, 1976

[21] Appl. No.: 708,531

Related U.S. Application Data

[63] Continuation of Ser. No. 512,727, Oct. 7, 1974, abandoned.

[52] U.S. Cl. ................................ 156/475; 156/487

[51] Int. Cl.² ........................................ B29C 17/00

[58] Field of Search ... 156/215, 202, 216, 475–492, 156/DIG. 4, 42; 93/36.9; 53/137

[56] References Cited

UNITED STATES PATENTS

| | | | |
|---|---|---|---|
| 1,046,658 | 12/1912 | Schoettle | 156/475 |
| 1,188,747 | 6/1916 | Fischer | 156/487 |
| 1,244,438 | 10/1917 | Fogde et al. | 156/487 X |
| 1,274,600 | 8/1918 | Richter | 156/487 |
| 1,343,264 | 6/1920 | Gwinn | 156/487 |
| 3,199,262 | 8/1965 | Miller et al. | 156/486 |

*Primary Examiner*—David A. Simmons
*Attorney, Agent, or Firm*—Jacox & Meckstroth

[57] ABSTRACT

A series of labels are applied to the top surfaces of a succession of articles such as containers being fed along a path by a conveyor, and each label is wiped downwardly against the corresponding container by a rotating paddle wheel applicator having outwardly projecting flexible vanes. One or more of the applicators are mounted on a shaft supported by brackets secured to a housing, and the shaft is driven by an endless belt connected to a motor enclosed within the housing. The applicator and motor form a part of a label applying unit which is supported for vertical adjustment by a pair of side support members mounted for horizontal adjustment on a base support member to provide for conveniently and quickly positioning the axis of the applicator according to the size of the labels and the height and width of the containers. Two of the label applicating units may be arranged on opposide sides of the path of articles or containers to provide for attaching opposite end portions of each label to opposite sides of the corresponding container.

10 Claims, 4 Drawing Figures

DEVICE FOR APPLYING LABELS TO ARTICLES

This is a continuation of application Ser. No. 512,727, filed Oct. 7. 1974, now abandoned.

BACKGROUND OF THE INVENTION

In the applicaton of adhesive labels to box-like containers or other articles, it is frequently desirable for each label to be applied to both a top surface and a side surface of the corresponding container so that the label extends around a corner and forms a security seal for the container. It is also sometimes desirable to attach a label so that the label extends across the top surface of the container and down opposite sides. Such a label may be used, for example, on a container having a sliding box or tray within an enclosure to assure that the box or tray is retained closed within the enclosure.

Usually, each label is initially attached or applied to either the top surface or side surface of the container and is then folded over against the other surface in response to movement of the container along an elongated label folding and camming device. The device may consist of either a long row of angularly arranged fingers or a curved camming rail which progressively folds the attached label around the corner of the container and onto the other surface. It has been found that such label camming devices require movement of the containers through a zone having substantial length, and when the devices are adjustable, require substantial time for adjustment when it is desired to set up for applying labels to containers of a different size or shape.

It is also known to use a set of rotary brushes for pressing applied labels against opposite surfaces of containers for assuring that each label is attached to the container without wrinkles. For example, U.S. Pat. No. 1,274,600 and U.S. Pat. No. 15,254 each discloses a set of rotary brushes for wiping labels against opposite surfaces or sides of a series of articles or containers being fed by a conveyor along a path.

In many applications for a label applying device, it is desirable for the device to be constructed so that it may be conveniently and quickly adjusted to accommodate containers or other articles of different heights and/or widths as well as labels of different sizes and thereby minimize the set up time. It is also desirable to provide for minimizing the time required to install a label applying device and to provide the device with an independent drive system which permits one or more of the devices to be independently positioned according to the shape and size of the labels to be applied and/or the shape and size of the containers or articles which receive the labels.

SUMMARY OF THE INVENTION

The present invention is directed to an improved device for receiving a succession of articles being fed along a predetermined pathand for successively securing or applying corresponding labels to the articles, and which incorporates all of the desirable features mentioned above. In particular the label applying device of the invention may be quickly adjusted and positioned for accommodating labels and articles of different sizes and shapes, and is adapted for relatively high speed operation so that the labels may be applied to the articles at a selected optimum speed. The device of the invention also assures that each label is smoothly and firmly attached to the corresponding article without any wrinkles or creases in the label, and may be used in pairs for applying a label to opposite sides of a container and thereby assure that the container is positively closed and sealed.

In accordance with one embodiment of the invention, the above features and advantages are provided by a label applying unit which is supported for both vertical and horizontal adjustment relative to an adjacent conveyor which delivers a series of articles or containers along a predetermined linear path. The label applying unit includes a housing which encloses an electric motor and supports a rotatable shaft extending parallel to the path of the articles. One or more paddle-like resilient applicators are mounted on the shaft which is driven by an endless belt connected to the motor. Each of the rotary applicators has a plurality of angularly arranged flexible fingers or vanes which are adapted to engage a portion of each label and fold or wipe it downwardly into firm attachment with the container.

DESCRIPTION OF THE PREFERRED EMBODIMENT

Figure 1:
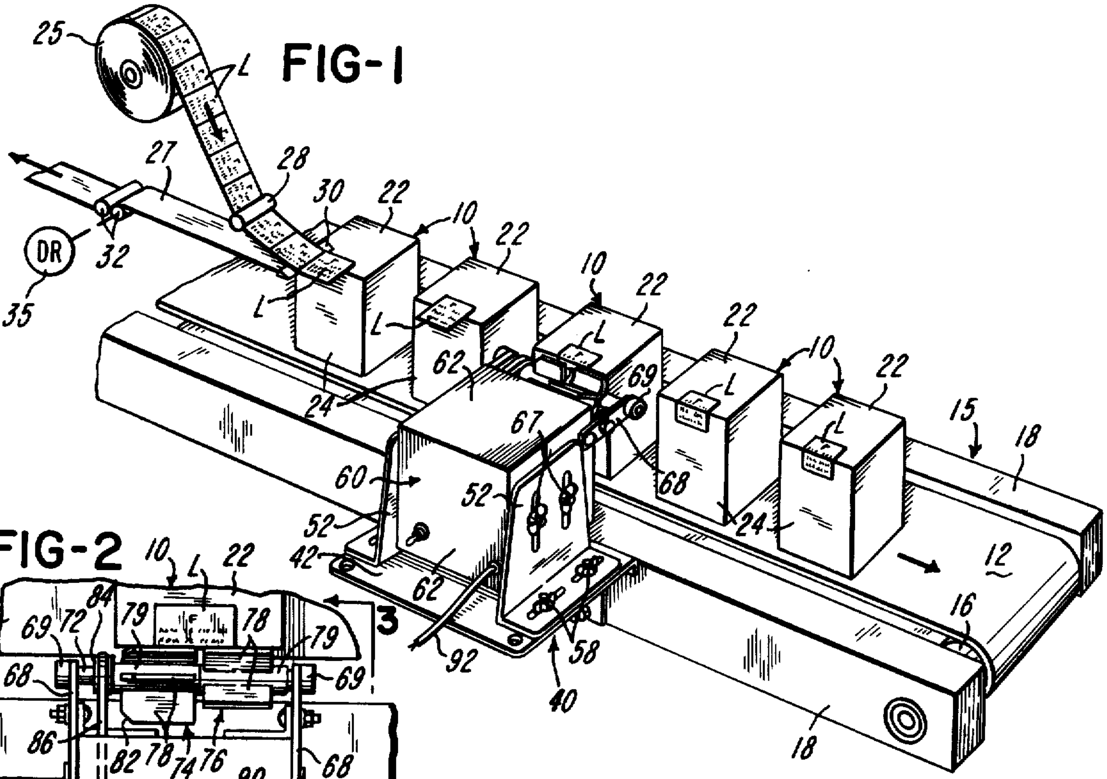
FIG. 1 is a perspective view of a label applying device constructed in accordance with the invention and illustrating its use for completing the application of a series of pressure sensitive labels attached to corresponding containers being transferred by a conveyor.

Referring to FIG. 1 of the drawing, a succession of articles in the form of box-like folded cardboard containers 10 are delivered or transferred along a horizontal linear path by the upper run of an endless belt 12 forming part of a continuous conveyor 15. The belt 12 is directed around a set of end rollers 16 which are supported by parallel spaced tubular side rails 18. Each of the containers 10 has a folded top lid for flap 22 and parallel front and rear panels or walls 24. However, it is to be understood that the containers 10 are used for simplified illustration purposes only and that other articles or containers of different sizes and configurations may be conveyed by the endless belt conveyor 15 or another form of conveyor.

A series of pressure sensitive labels L are supplied from a supply roll 25 and are carried to the linear path of the containers 10 by a protector carrier strip 27 whih is directed around one or more guide rollers 28. A wedge-like stripping member 30 (FIG. 1) is positioned directly above the path of the container lids or flaps 22, and the carrier strip 27 is adapted to be pulled around the sharp edge of the stripping member 30 by a set of pinch rolls 32 which are driven by an electric motor 35. The motor 35 is controlled by a switch (not shown) which senses the position of each container 10 on the conveyor 15. Thus as each container 10 passes under the stripping member 30, a label L is pealed or stripped from the carrier strip 27, and a portion of the label is attached to the front leading edge portion of the container top flap 22 by a suitable pressure roller (not shown).

Figure 3:
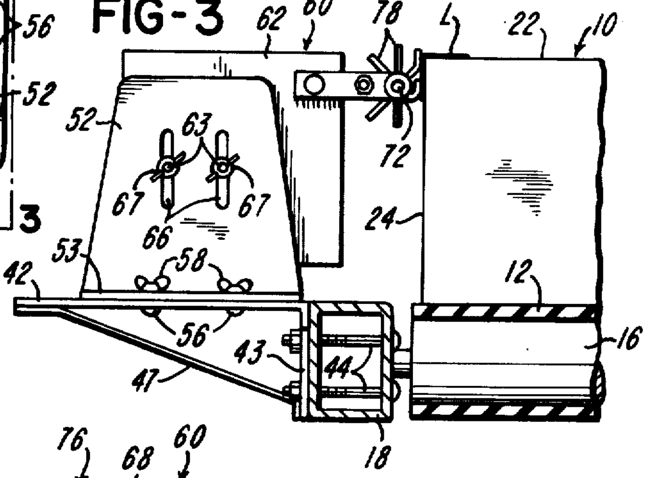
FIG. 3 is a side elevational view of the label applying device and a fragmentary section of the conveyor, as taken generally on the line 3—3 of FIG. 2.

In accordance with the present invention, the outwardly projecting and unattached portion of each label L carried by a container 10, is wiped downwardly and attached to the front wall 24 of the corresponding container 10 by a label applying device 40. As shown in FIGS. 1 and 3, the device 40 includes a formed sheet metal base member 42 which functions as a mounting bracket and includes a downwardly projecting flange 43 secured to one of the side rails 18 of the conveyor 15 by a set of bolts 44. The base member 42 also includes an inclined reinforcing strut or brace 47.

The base member 42 supports a pair of formed sheet metal vertical or side support members 52 which are arranged in parallel spaced relation on the base support member 42. Each of the vertical support members 52 includes an outwardly projecting bottom flange 53 which has a set of aligned slots 54 for receiving corresponding carriage bolts 56 extending upwardly through the base support member 42. Each of the bolts 56 receives a wing nut 58 which provides for conveniently and quickly adjusting the support members 52 horizontally in a direction perpendicular to the adjacent side rail 18 of the conveyor 15.

A label applying unit 60 forms a part of the label applying device 40 and includes a box-like sheet metal housing 62 which is positioned between the side support members 52. Another set of carriage bolts 63 project outwardly from opposite sides of the housing 62 and extend through corresponding tubular spacers 64 and vertical slots 66 formed within the adjacent side support members 52. Another set of wing nuts 67 are threaded on the bolts 63 for rigidly securing the housing 62 to the vertical support members 52. When the nuts 67 are released, the housing 62 may be quickly adjusted vertically for reasons which will be explained later.

A pair of arms or brackets 68 are mounted on the upper inner corner portions of the housing 62 and project inwardly above the adjacent conveyor side rail 18. The brackets 68 support a corresponding set of bearings 69, and a shaft 72 is rotatably supported by the bearing 69. A set of paddle wheel applicator members 74 and 76 are secured to the shaft 72 for rotation therewith, and each applicator member is molded of a resilient rubber material. Each of the applicators 74 and 76 includes a plurality of four uniformly spaced flexible fingers or vanes 78 which are integrally connected by a cylindrical hub portion 79.

Figure 2:
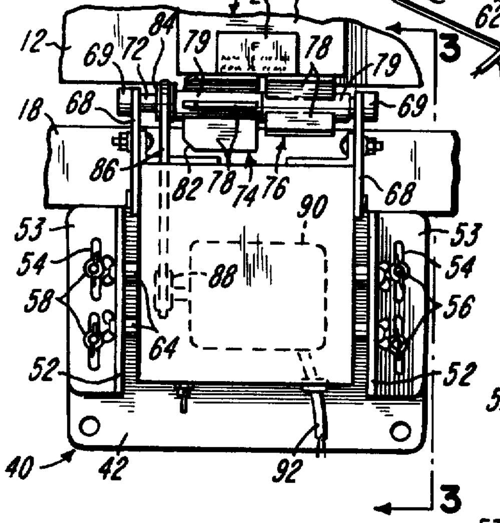
FIG. 2 is a plan view of the label applying device shown in FIG. 1 and a fragmentary plan view of a container.

Each of the flexible vanes 78 is generally flat, and the applicator 76 is positioned on the shaft 72 so that its vanes 78 are arranged at an angle of 45° with respect to the vanes 78 of the applicator 74. The vanes 78 of the applicator 74 are also provided with beveled or tapered leading edges 82 which, as will become apparent, facilitate receiving the leading edge of a label. A driven pulley 84 is also secured to the shaft 72 and is connected by an endless flexible belt 86 to another pulley 88 having the same diameter and mounted on the output shaft of an electric motor 90. As illustrated in FIG. 2, the motor 90 is enclosed within the housing 62 and forms part of the label applying unit 60. Electrical power is supplied to the motor 90 through a flexible power supply cord 92, and the motor 90 may be of the variable speed type, though a fixed-speed motor can also be used.

In operation of the label applying device 40, the wing nuts 58 and 66 are released, and the laber applying unit 60 is positioned so that the axis of the shaft 72 supporting the rotary applicators 74 and 76, is positioned in a predetermined relation relative to the path of the containers 10 being transferred or delivered by the conveyor 15. As shown in FIGS. 2 and 3, the axis of the applicators 74 and 76 is positioned slightly in front of the path of the front walls 24 of the containers 10 and slightly below the path of the top walls or flaps 22 of the containers. The motor 90 and applicators 74 and 76 are driven at a predetermined speed, for example, 1200 rpm and in a clockwise direction (FIG. 3) so that as the containers 10 are fed or delivered past the label applying unit 60, the rotation of the applicators 74 and 76 folds or wipes the projecting unsupported portion of each label downwardly and firmly attaches it to the front wall 24 of the corresponding container. As best shown in FIG. 3, the flexibility of the vanes 78 assures that each label portion is firmly attached or secured to the corresponding container 10 and without wrinkles or creases.

Figure 4:
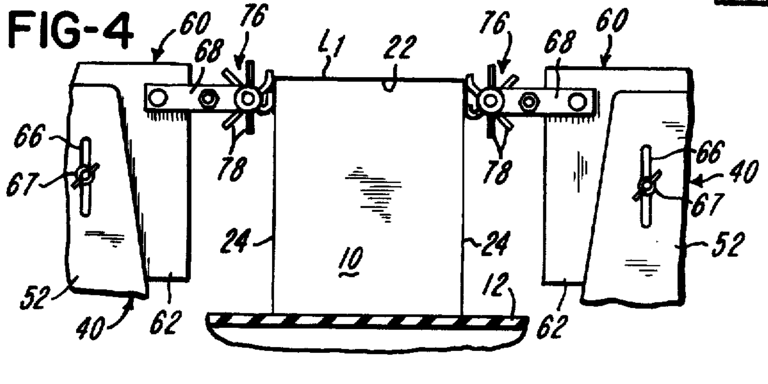
FIG. 4 is a fragmentary elevational view similar to FIG. 3 and illustrating the use of two of the label applying devices positioned on opposite sides of the conveyor delivering a series of articles.

In reference to FIG. 4, it is sometimes desirable to attach labels $L_1$ to corresponding containers 10 so that each label extends across the entire top surface of the container and has opposite end portions which extend downwardly along opposite sides of the container. For example, the container might consist of a tray or drawer slidably supported in a tubular enclosure, and the label serves to retain the tray in addition to being a security type label. When such labels are desired, two of the label applying devices 40 are arranged in opposing relation on opposite sides of the conveyor 15 and the path of the containers 10. Thus, as the outwardly projecting unsupported opposite end portions of each label $L_1$ are fed into engagement with the corresponding rotary applicators 74 and 76, the end portions of each label $L_1$ are simultaneously folded and wiped downwardly by the applicators against the opposite side walls of the container.

From the drawing and the above description, it is apparent that a label applying device constructed and used in accordance with the invention, provides desirable features and advantages. For example, by simply releasing the wing nuts 58 and 67 which retain the label applying unit 60 in a preselected position, the unit 60 may be quickly and conveniently adjusted or positioned according to the height and width of a different article or container. As a result, the label applying device of the invention is highly desirable for use in an automatic label applying system which must quickly and conveniently accommodate containers or articles of different sizes and configurations.

Another important feature is provided by the construction of the paddle wheel type applicators 74 and 76. That is, sufficient space is provided between adjacent vanes 78 of each applicator to permit each vane to flex substantially, as shown in FIGS. 3 and 4, to assure that the entire surface of each label is pressed firmly against the side wall of the container and thereby produce a positive application of each label. The arrangement of two applicators 74 and 76 in axial alignment on the shaft 72 and in angular offset relation, also aids in providing for a high speed operation of the conveyor 15 and of the label applying device 40 to obtain optimum operating efficiency. While the box-like containers 10 are shown for purpose of illustrating the invention, it is understood that the articles which receive the labels may be of many different sizes and configurations, and may have flat or curved label receiving surfaces since the flexible resilient vanes 78 will conform to the contour of the surfaces. The simple adjustment for the label applying unit 60 is particularly desirable for minimizing the setup time when the size or configuration of the containers or articles is changed.

While the method and form of label applying device herein described constitute a preferred embodiment of the invention, it is to be understood that the invention is not limited to the precise method and form of device described, and that changes may be made therein without departing from the scope and spirit of the invention as defined in the appended claims.

The invention having thus been described, the following is claimed:

1. An improved device for receiving a succession of articles being fed along a predetermined path and for successively applying corresponding labels to the articles, said device comprising a plurality of rotary applicators each including a plurality of outwardly projecting flexible wiping elements, a shaft supporting said applicator for rotation in axially aligned relation, power operated drive means connected to rotate said applicator, said wiping elements of one applicator being disposed in angular offset relation to said wiping elements of the other said applicator, and means supporting said shaft and said applicators for adjustment relative to both the height and width of the articles being fed along said path for conveniently accommodating articles of different sizes and configurations.

2. A device for receiving a succession of articles being fed along a predetermined path and for successively securing corresponding labels to the articles, said device comprising an applicator including a plurality of angularly arranged and outwardly projecting flexible wiping elements, a shaft supporting said applicator, a drive motor connected to rotate said applicator, said drive motor, said shaft and said applicator forming a label applying unit, means supporting said label applying unit for adjustment generally vertically and horizontally relative to the height and width of the articles being fed along said path for conveniently accommodating articles of different shapes and sizes, said supporting means provide for securing said label applying unit at a selected position and include a base support member extending generally parallel to the path of the articles, a pair of generally parallel side support members disposed generally perpendicular to said base support member, said label applying unit is positioned between said side support members, said adjusting means is effective to provide for adjusting said side support members on said base support member, and said adjusting means is effective to provide for adjusting said label applying unit between said side support members for quickly positioning the axis of said shaft and said applicator relative to the path of the articles.

3. A device as defined in claim 2 wherein each of said wiping elements of said applicator comprises a generally flat rubber-like flexible vane, and all of said vanes of said applicator are integrally connected.

4. A device as defined in claim 3 wherein each of said vanes has a tapered leading edge relative to the path of the articles to provide for smooth engagement of said vane with each label.

5. A device adapted to be positioned adjacent a conveyor system for receiving a succession of articles being fed along a predetermined path by the conveyor system and for successively attaching corresponding labels to the articles, said device comprising a rotary applicator including a plurality of angularly arranged and outwardly projecting flexible wiping elements, a shaft supporting said applicator for rotation on an axis extending generally parallel to said path, a drive motor connected to rotate said applicator, said drive motor, said shaft and said applicator forming a label applying unit, means supporting said label applying unit for independent movement in both vertical and horizontal directions relative to said conveyor system, first adjustment means for adjustably positioning said label applying unit in a vertical direction relative to the height of the articles being fed along said path and while maintaining the orientation of said shaft and said applicator relative to said path, and second adjustment means for adjustably positioning said label applying unit in a horizontal direction relative to the width of the articles being fed along said path and while maintaining the orientation of said shaft and said applicator relative to said path.

6. A device as defined in claim 5 including at least two of said rotary applicators supported by said shaft in axially aligned relation, and said wiping elements of said one applicator are disposed in angular offset relation to said wiping elements of the other said applicator.

7. A device as defined in claim 5 wherein a plurality of said label applying units are disposed in opposing relation on opposite sides of the path of the articles.

8. A device as defined in claim 5 including a housing enclosing said motor, a set of bracket members mounted on said housing and supporting said shaft for rotation, said motor having a shaft, and drive means connecting said shaft of said motor with said shaft supporting said applicator.

9. A device as defined in claim 5 wherein said applicator comprises a rubber-like body having integrally connected said wiping elements.

10. A device for receiving a succession of articles being fed along a predetermined path and for successively securing corresponding labels to the articles, said device comprising an applicator including a plurality of angularly arranged and outwardly projecting flexible wiping elements, a shaft supporting said applicator for rotation on an axis, a drive motor connected to rotate said applicator, means supporting said drive motor and said shaft and said applicator to form a label applying unit, and means supporting said label applying unit for independent adjustment generally vertically and horizontally relative to the height and width of the articles being fed along said path and without changing the orientation of said axis relative to said path for conveniently accommodating articles of different shapes and sizes.

* * * * *